United States Patent
Titze et al.

(10) Patent No.: US 10,621,861 B2
(45) Date of Patent: Apr. 14, 2020

(54) METHOD AND SYSTEM FOR CREATING A LANE-ACCURATE OCCUPANCY GRID MAP FOR LANES

(71) Applicant: VOLKSWAGEN AKTIENGESELLSCHAFT, Wolfsburg (DE)

(72) Inventors: Andreas Titze, Braunschweig (DE); Stefan Ortmann, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 35 days.

(21) Appl. No.: 15/773,726

(22) PCT Filed: Nov. 9, 2016

(86) PCT No.: PCT/EP2016/077105
§ 371 (c)(1),
(2) Date: May 4, 2018

(87) PCT Pub. No.: WO2017/089135
PCT Pub. Date: Jun. 1, 2017

(65) Prior Publication Data
US 2018/0322777 A1    Nov. 8, 2018

(30) Foreign Application Priority Data
Nov. 25, 2015   (DE) .................. 10 2015 015 157
Apr. 1, 2016    (DE) .................. 10 2016 205 434

(51) Int. Cl.
*G08G 1/01*     (2006.01)
*G06F 16/29*    (2019.01)
(Continued)

(52) U.S. Cl.
CPC ........... *G08G 1/0133* (2013.01); *B60W 30/00* (2013.01); *G06F 16/29* (2019.01);
(Continued)

(58) Field of Classification Search
CPC ..................................................... G08G 1/0133
See application file for complete search history.

(56) References Cited

U.S. PATENT DOCUMENTS 7,345,699 B2 *   3/2008   Janssen .................. G01C 15/00
                                                          348/148
8,676,494 B2 *   3/2014   Dorum ................... G01C 21/32
                                                          345/427
(Continued)

FOREIGN PATENT DOCUMENTS

DE   102011119762 A1   6/2012
DE   102014002821 A1   8/2015
(Continued)

OTHER PUBLICATIONS

Search Report for International Patent Application No. PCT/EP2016/077105; dated Feb. 15, 2017.

*Primary Examiner* — Bao Long T Nguyen
*Assistant Examiner* — Michael A Berns
(74) *Attorney, Agent, or Firm* — Barnes & Thornburg LLP

(57) ABSTRACT

A method for creating a lane-accurate occupancy grid map for lanes. In at least one mobile device, an environment is sensed by a camera and evaluated by an evaluating unit. The evaluating unit defines a section in the environment and determines a lane in the section. Objects in the environment or in the section are also detected and classified by the evaluating unit. The object information, section information, time information, and the lane information are transmitted to a map-creating device, which creates a lane-accurate occupancy grid map for the lane therefrom. The lane-accurate
(Continued)

occupancy grid map can be transmitted back to the mobile device. Also disclosed is an associated system.

10 Claims, 3 Drawing Sheets

(51) Int. Cl.
  *G06K 9/00* (2006.01)
  *G08G 1/065* (2006.01)
  *G09B 29/00* (2006.01)
  *B60W 30/00* (2006.01)
  *G01C 21/36* (2006.01)

(52) U.S. Cl.
  CPC ..... *G06K 9/00798* (2013.01); *G06K 9/00805* (2013.01); *G06K 9/00812* (2013.01); *G08G 1/0112* (2013.01); *G08G 1/0141* (2013.01); *G08G 1/065* (2013.01); *G09B 29/007* (2013.01); *G01C 21/3602* (2013.01)

(56) References Cited

U.S. PATENT DOCUMENTS

| | | | |
|---|---|---|---|
| 9,429,438 B2* | 8/2016 | Weng | G01C 21/32 |
| 9,581,459 B2* | 2/2017 | Korzunov | G01C 21/30 |
| 10,161,754 B2* | 12/2018 | Matsushita | G01C 21/32 |
| 2012/0078867 A1 | 3/2012 | Dorum | |
| 2018/0321046 A1* | 11/2018 | Titze | G09B 29/003 |
| 2019/0213873 A1* | 7/2019 | Adireddy | G08G 1/0129 |

FOREIGN PATENT DOCUMENTS

| | | | |
|---|---|---|---|
| EP | 2876620 A1 | 5/2015 | |
| WO | 2012150591 A2 | 11/2012 | |

\* cited by examiner

METHOD AND SYSTEM FOR CREATING A LANE-ACCURATE OCCUPANCY GRID MAP FOR LANES

PRIORITY CLAIM

This patent application is a U.S. National Phase of International Patent Application No. PCT/EP2016/077105, filed 9 Nov. 2016, which claims priority to German Patent Application Nos. 10 2015 015 157.6, filed 25 Nov. 2015, and 10 2016 205 434.1, filed 1 Apr. 2016, the disclosures of which are incorporated herein by reference in their entireties.

SUMMARY

Illustrative embodiments relate to a method and a system for creating a lane-accurate occupancy grid map for lanes.

BRIEF DESCRIPTION OF THE DRAWINGS

The disclosed embodiments are explained in more detail below with reference to the figures, in which.

DETAILED DESCRIPTION

Figure 1:
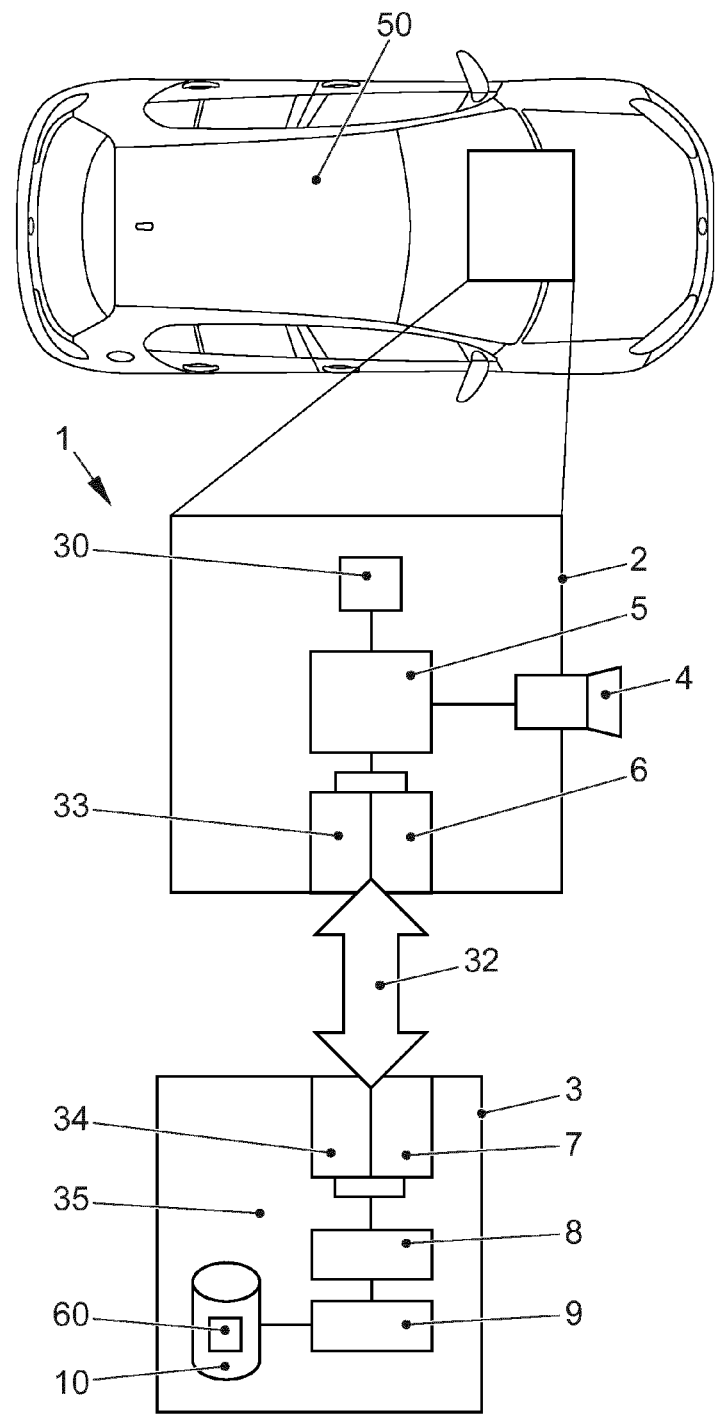
FIG. 1 shows a schematic illustration of an embodiment of the system for creating a lane-accurate occupancy grid map.

Modern motorized transportation vehicles have a multiplicity of assistance systems, including navigation systems which are able to locate a motorized transportation vehicle within an environment. Such a navigation system is based, for example, on a global positioning system (GPS) in which a position of the motorized transportation vehicle is determined by evaluating a plurality of satellite-based signals. Furthermore, systems in which maps are created from the environment of the motorized transportation vehicle are also known. In the case of a subsequent journey through a region which has already been mapped, the motorized transportation vehicle can then be located in the created map. Within the scope of proactive traffic planning, it is desirable for a driver of the motorized transportation vehicle to be aware of a traffic volume on his travel route.

DE 10 2014 002 821 A1 discloses a method for locating a mobile device in a surrounding area, the device having a plurality of sensors for capturing the surrounding area of the device using different locating methods, a reference map which comprises a plurality of positions within the surrounding area being available for the surrounding area, at least one locating method which can be carried out using at least one sensor for capturing the surrounding area being recommended for at least one position within the surrounding area, the at least one locating method which can be carried out using at least one sensor and is recommended according to the reference map being used to locate the device for a current position of the mobile device.

DE 10 2011 119 762 A1 discloses a positioning system suitable for a motorized transportation vehicle and a corresponding method. The system comprises a digital map in which data relating to location-specific features are recorded in a localized manner, at least one environment detection apparatus for capturing the location-specific features in the surrounding area of the transportation vehicle, and a locating module coupled to the digital map and the environment detection apparatus. The locating module has a processing unit for comparing the captured data and the data recorded in the digital map using the location-specific features and for locating the transportation vehicle position on the basis of the location-specific features recorded in a localized manner in the digital map. The system also comprises an inertial measuring unit of the transportation vehicle for transportation vehicle movement data, which measuring unit is coupled to the locating module, the processing unit of which is configured to determine the transportation vehicle position by the transportation vehicle movement data on the basis of the position located on the basis of the location-specific features.

Disclosed embodiments provide a method and a system for creating a map in which a lane-accurate occupancy grid map can be provided.

A method for creating a lane-accurate occupancy grid map for lanes is provided, comprising the following operations in at least one mobile device: capturing an image sequence of an environment of the at least one mobile device by at least one camera, identifying and classifying objects in the captured image sequence by an evaluation unit, determining object positions of the objects relative to the at least one mobile device by the evaluation unit, defining a section in the environment, the section having a predetermined size and predetermined boundaries, assigning the identified and classified objects to the determined object positions in the defined section, determining a lane present in the section by the evaluation unit, transmitting object information and the object positions of the identified and classified objects, section information relating to the defined section, lane information and an item of time information to a map creation device by a transmitting device, repeating the preceding operations to define further sections of the environment; also comprising the following operations in the map creation device: receiving the object information and the object positions, the section information, the lane information and the time information for each of the sections from the at least one mobile device, comparing the individual sections with one another on the basis of the object information and object positions, the section information, the lane information and the time information, joining the sections of the at least one mobile device at their respectively adjacent boundaries, merging the joined sections of the at least one mobile device to form a digital map, determining a current lane occupancy for lanes in sections of the digital map by assigning the at least one mobile device to the determined lane in the corresponding section on the basis of the object information and object positions, section information, the lane information and the time information received from the at least one mobile device.

A system for creating a lane-accurate occupancy grid map for lanes is also, comprising: at least one mobile device comprising: at least one camera for capturing an image sequence of an environment of the at least one mobile device, an evaluation unit, and a transmitting device for communicating with a map creation device, the evaluation unit being designed to identify and classify objects in the captured image sequence, to determine object positions of the objects relative to the at least one mobile device, to define a section in the environment, the section having a predetermined size and predetermined boundaries, to assign identified and classified objects to the determined object positions in the defined section, to determine a lane present in a section, to transmit object information and the object positions of the identified and classified objects, section information relating to the defined section, lane information and an item of time information to the map creation device by the transmitting device, and to repeat the preceding operations to define further sections of the environment; and the map creation device which is designed to receive the object information and the object positions, the section information, the lane information and the time information for each of the sections from the at least one mobile device, to compare the individual sections with one another on the basis of the object information and object positions, the section information, the lane information and the time information, to join the sections of the at least one mobile device at their respectively adjacent boundaries, and to merge the joined sections of the at least one mobile device to form a digital map, the map creation device also being designed to determine a current lane occupancy for lanes in sections of the digital map by assigning the at least one mobile device to the determined lane on the basis of the object information and object positions, section information, the lane information and the time information received from the at least one mobile device.

Provision is made for the mobile device to be a motorized transportation vehicle and for the map creation device to be a central server with which the motorized transportation vehicle communicates via a wireless communication connection. Further mobile devices are then further motorized transportation vehicles, for example, which likewise communicate with the central server. However, provision may also be made for the map creation device to be integrated in the mobile device.

At least one disclosed embodiment provides for the current lane occupancy to be converted into a traffic density by the map creation device and to be assigned to a section in the digital map as additional information. A traffic volume can be easily represented for the defined section by calculating and assigning the traffic density. Furthermore, information relating to a traffic density for all sections in the digital map can also be provided in this manner. A driver or an automated controller can thus use the traffic density provided in this manner to carry out route planning, for example.

Another disclosed embodiment provides for the calculated traffic density to be compared with a limit value by the map creation device, a traffic condition "traffic jam" being allocated to the section as additional information if the limit value is exceeded, and a traffic condition "no traffic jam" being allocated to the section as additional information if the limit value is not exceeded. This is beneficial, in particular, in route planning. If sections or the roadways in these sections are marked with "traffic jam", it is possible to avoid driving through these sections and a different route can be planned and carried out. In contrast, if the condition is "no traffic jam", the originally planned route can still be followed.

Provision may also be made for the traffic density for a lane in a section to be alternatively or additionally determined by the map creation device on the basis of further parameters. The further parameters may be provided, for example, by a central traffic planning facility, for example, a control center. Lanes can then be marked with "traffic jam" even though the traffic is still flowing, with the result that active traffic management planning can be carried out. However, it is also possible for other traffic information services to provide a traffic density as a further parameter for sections in the digital map.

At least one disclosed embodiment provides for the lane determined in a section to be described by a corridor comprising a left-hand lane boundary and a right-hand lane boundary, the left-hand lane boundary and the right-hand lane boundary each being described as lane functions. In this way, a volume of data needed to describe the lane can be reduced. This saves bandwidth during communication between the at least one mobile device and the map creation device via a communication connection.

At least one disclosed embodiment provides, in particular, for the lane functions to be third-degree polynomial functions. This results in great data reduction with simultaneous flexibility. Only four coefficients must then be transmitted for each coordinate, with the result that a total of twelve coefficients for each section must be transmitted in the case of three dimensions. In this case, provision may be made, in particular, for the polynomial functions to have a time as an independent variable. However, it is likewise possible to use a location coordinate, for example, a road etc., as an independent variable.

Another disclosed embodiment provides for a parking space occupancy to be determined by the map creation device for at least one section on the basis of the received object information and object positions, section information, lane information and the time information and for this parking space occupancy to be assigned, as parking space occupancy information, to the corresponding section in the digital map as additional information. The parking space occupancy information can then be made available to a mobile device, for example, by the map creation device.

Parts of the mobile device, of the map creation device and also of the system may, individually or in combination, be a combination of hardware and software, for example, program code which is executed on a microcontroller or microprocessor.

FIG. 1 illustrates a schematic illustration of a system 1 for creating a digital map 60. The system 1 comprises at least one mobile device 2 which is formed in a motorized transportation vehicle 50 in this example, and a map creation device 3 which may be a central server, for example. The mobile device 2 comprises a camera 4, an evaluation unit 5, a transmitting device 6, a height sensor 30 and a receiving device 33. The map creation device 3 comprises, for example, a receiving device 7, a transmitting device 34, a joining device 8, a merging device 9 and a memory 10 which stores the digital map 60. The mobile device 2 and the map creation device 3 may communicate with one another via a communication connection 32.

Figure 2:
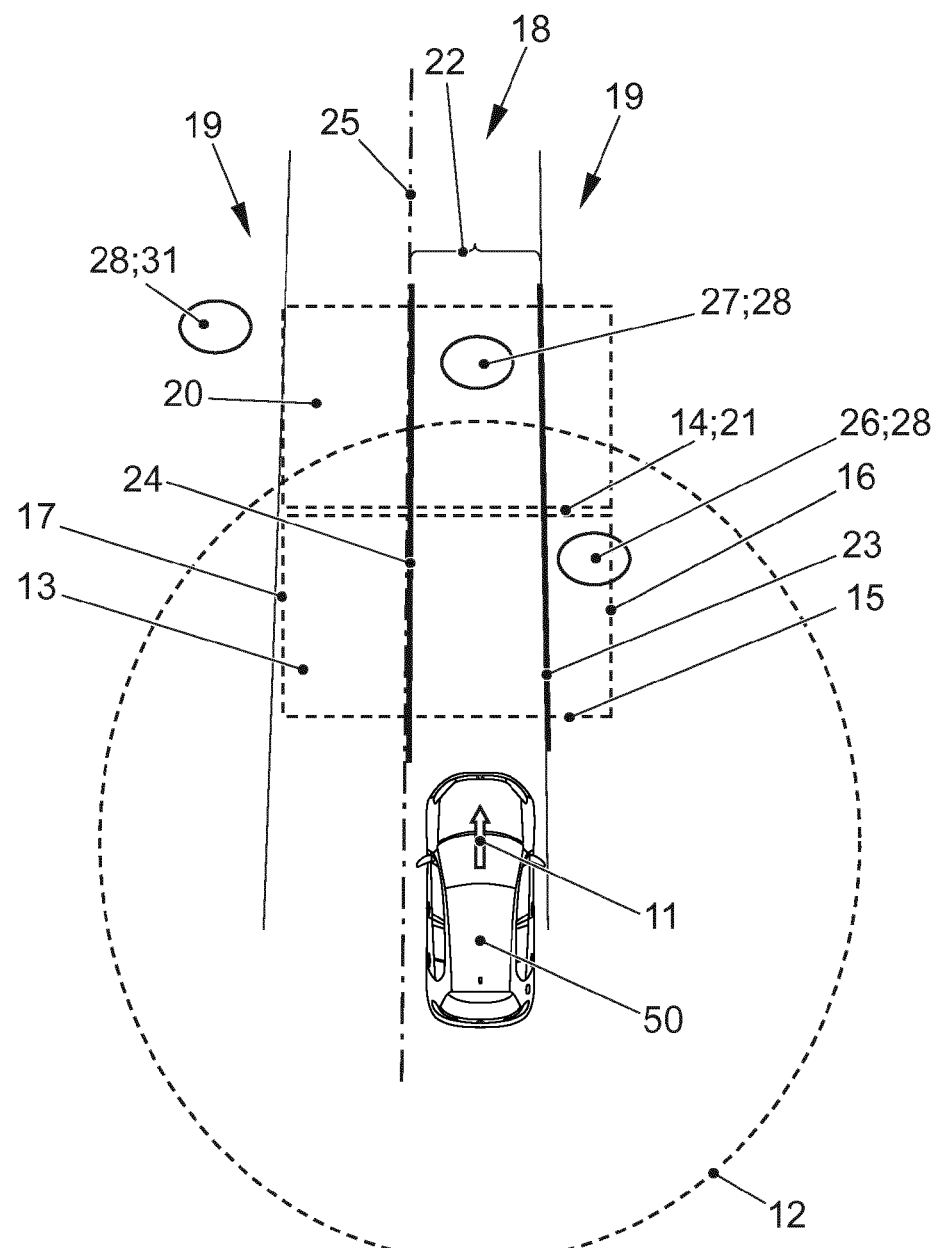
FIG. 2 shows a schematic illustration of a typical environment of a motorized transportation vehicle for illustrating the method.

FIG. 2 shows a schematic illustration of a typical environment 12 of a motorized transportation vehicle 50 for illustrating the method. The camera 4 (see FIG. 1) points in a direction of travel 11 of the motorized transportation vehicle 50, for example. The camera 4 captures a sequence of images of the environment 12 of the motorized transportation vehicle 50. The captured sequence of images is passed from the camera 4 to the evaluation unit 5. The evaluation unit 5 defines a section 13 from the sequence of images. This section 13 has a predefined size. Such a section 13 also has a front boundary 14, a rear boundary 15, a right-hand boundary 16 and a left-hand boundary 17. The defined section 13 contains a portion of a road 18 on which the motorized transportation vehicle 50 is currently situated and a part of the surrounding area 19 of the road 18. A further section 20 is defined at a later time from a further sequence of images, with the result that the rear boundary 21 of the further section 20 is the same as the front boundary 14 of the section 13 defined before it. In this manner, the environment 12 of the motorized transportation vehicle 50 is gradually captured at different times and is gradually concatenated as sections 13, 20.

In each section 13, 20, the evaluation unit 5 determines a lane 22 of the motorized transportation vehicle 50. In this example, the lane 22 is bounded on the right-hand side by the roadway boundary 23 of the road 18, in which case the right-hand roadway boundary 23 can be given by the right-hand roadway line, for example. The left-hand lane boundary 24 of the lane 22 is given by a center line 25 of the road 18, for example.

The respective lane boundary 23, 24 of the lane 22 is recognized by an image recognition method in the evaluation unit 5 and is mathematically represented as a third-degree polynomial for each coordinate, for example:

$$X(t) = a_3 t^3 + a_2 t^2 + a_1 t + a_0,$$

$$Y(t) = b_3 t^3 + b_2 t^2 + b_1 t + b_0,$$

$$Z(t) = c_3 t^3 + c_2 t^2 + c_1 t + c_0.$$

Figure 3:
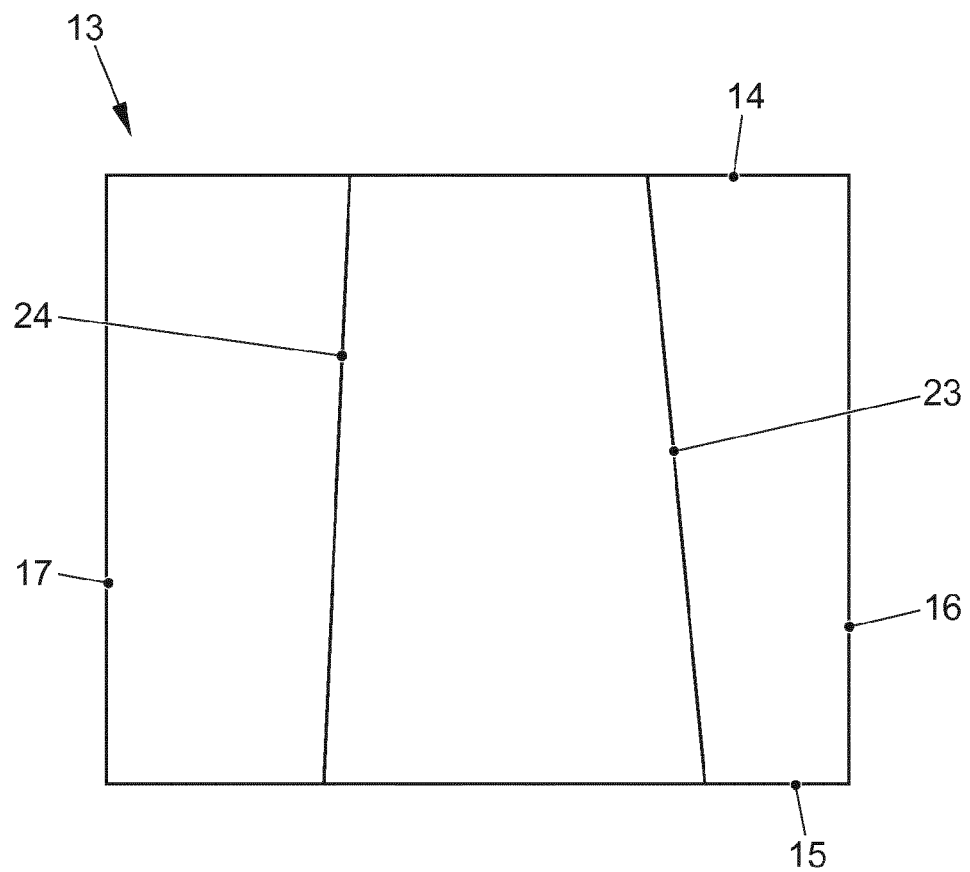
FIG. 3 shows a schematic illustration of a defined section having lane functions.

The coordinates X, Y and Z relate to a coordinate system which is based, for example, on the camera position or the center point of the front boundary 14 of the section 22. The coordinate X describes the coordinate system in the direction of travel 11, the coordinate Y describes the coordinate system in the lateral direction and the coordinate Z describes the coordinate system in the vertical direction. The function X(t) therefore describes a function in the X direction on the basis of a time t which is related to the time at which the section 13 was determined. Each point of the detected lane 22 is therefore spatially defined. The coefficients of the lane functions can be mathematically determined by suitable fitting methods, with the result that the individual lane functions are defined by the determined coefficients a1, a2, a3, a0 and b1, b2, b3, b0 and c1, c2, c3, c0 and map the lane boundaries 23, 24 as a function of the time. FIG. 3 shows a schematic illustration of the section 13 having the lane functions.

The coefficients form an item of lane information which is transmitted, together with an item of time information and an item of section information, to the map creation device 3 or the server by the transmitting device 6 of the mobile device 2. Transmission is carried out using a wireless communication connection 32, for example. The practice of describing the lane 22 by the polynomial functions makes it possible to considerably reduce the volume of data to be transmitted, with the result that only small volumes of data have to be transmitted for each section 13, 20.

Furthermore, provision is also made for further objects 28 in the environment 12 to be captured. There are, for example, landmarks 26, 27 in the surrounding area 19 of the lane 22 and in the environment 12. The landmark 26 may be, for example, a tree or road lighting, but the landmark 27 may also be an obstacle in the lane 22. This may be, for example, a further motorized transportation vehicle which marks the end of a traffic jam, or an indication that work is being carried out on this lane 22 and it is necessary to change the lane 22.

Provision is also made for the object 28 to also be able to describe snow or aquaplaning in the lane 22, for example, in which case such a state is identified using common image analysis methods.

Provision may also be made for parking garage information, in particular, information relating to available parking spaces, to be transmitted, for example, to the map creation device 3 by the functions X(t), Y(t) and Z(t) or as an item of additional information provided by the image analysis. Provision is made for an item of height information captured by a height sensor 30 (see FIG. 1) of the motorized transportation vehicle 50 to be transmitted, together with the information relating to the sections 13, 20, to the server since a parking garage level or an underground parking garage level belonging to a parking space can be identified in this manner. Sensors for determining the geographical height with respect to normal zero, that is to say sea level, are known from the prior art.

The camera 4 captures image contents, and a suitable object recognition method can be used to determine what object 28 is involved. It is likewise possible to determine a position of the object 28, for example, relative to the camera 4. This is carried out, for example, by comparing the identified objects 28 with objects stored in tables. As a result, a size of the objects 28 is determined and a distance to the motorized transportation vehicle 50 or to the camera 4 can then be inferred. The position of the object 28 is known by determining the angles of the objects 28 relative to the camera 4 in a plurality of sections 13, 20 determined in succession. The position can be defined, for example, as a vector or as a coordinate with a corresponding object type. This object information is likewise determined as a function of the time for each section 13, 20 and is transmitted to the map creation device 3 or the server by the transmitting device 6.

The map creation device 3 receives object information and associated object positions, section information, lane information and time information for each of the sections. These are combined by a suitable method such that a digital map 60 having the lane 22 is produced. Known pattern recognition methods, for example, can be used in this case. With the available information, such a method is able to assign the section information and to join the sections 13, 20 to one another given appropriate correspondence. The individual sections 13, 20 are joined in the map creation device 3, for example, by a joining device 8.

The similarity between various sections 13, 20 is determined, for example, by comparing the coefficients of the lane functions. If these correspond, it can be assumed that the same lane 22 is involved. For the purpose of verification, yet further information is compared, for example, the object information relating to the type and position of objects 28 which are situated outside the lane 22.

The digital map 60 of the lane 22 is improved by virtue of the fact that a multiplicity of mobile devices 2, for example, a multiplicity of motorized transportation vehicles 50, each transmit object information and associated object positions, section information, lane information and time information for each of the sections 13, 20 to the map creation device 3 and the map creation device 3 uses this information to create the digital map 60 with a high degree of accuracy, for example, by weighting and averaging or superimposition. A plurality of sections 13, 20 of a plurality of mobile devices 2 are averaged in the map creation device 3, for example, by the merging device 9. The digital map 60 is stored in the memory 10 and can be changed there at any time and retrieved again.

If, for example, an object 28 in a section 13, 20 has changed, the method in the map creation device 3 ensures that a particular number of items of information correspond in a first operation. These may be, for example, the coefficients of the lanes 22. If further parameters also correspond in a comparison, for example, object sizes and object types of the objects 28 (for example, in the case of a tree), it is assumed that this is a section 13, 20 which has already been captured at earlier time and has been stored in the digital map 60.

For example, the object type and the object size of an object 28, for example, a traffic sign 31, situated to the left of the left-hand lane likewise correspond in the sections 13, 20 to the previously created information relating to the sections 13, 20. However, the content of the traffic sign 31 may have changed in the interim (for example, because a speed specification has changed). On account of the fact that a particular number of items of information correspond, that is to say a temporally more current section 13, 20 has been assigned to a position in the digital map, and a small area (content of the traffic sign 31) is new, it would be assumed that the section must be updated and the sections 13, 20 are replaced by the map creation device 3. In this example, the speed specification is therefore updated.

Highly accurate localization in a local or global coordinate system can be calculated by identifying objects 28 forming landmarks 26, 27 and averaging the associated object positions. This is used to anchor the sections 13, 20 in the digital map 60.

An image of the environment 12 in a local (digital map 60) and global coordinate system is therefore compiled in the map creation device 3 or in the server and comprises a multiplicity of items of information from sections 13, 20. A multiplicity of captured sequences of images from a plurality of mobile devices can therefore be merged to form a single, highly accurate digital map 60.

Provision is made for the map creation device 3 to determine a current lane occupancy for lanes 22 in the sections 13, 20 of the digital map 60. This is carried out by assigning the at least one mobile device 2 to the lane 22 determined by the at least one mobile device 2 in the corresponding section 13, 20 on the basis of the object information and object positions, section information, the lane information and the time information received from the at least one mobile device 2. If the at least one mobile device 2 is therefore in a particular section 13 at a particular time, the at least one mobile device 2 is assigned to the particular section 13. The assignment is noted in the digital map 60. The method is similarly carried out for further mobile devices, with the result that the assignments of the further mobile devices to corresponding sections 13, 20 are also stored in the digital map 60 and, in this manner, an occupancy grid map is generated for the sections 13, 20 or the lanes 22 in the sections 13, 20. The map creation device 3 then determines a traffic density from the assignments by calculating the number of mobile devices for each individual section 13, 20, for example.

Such a traffic density can then be analyzed further by the map creation device 3, for example, by comparing it with a predefined limit value for the traffic density. If the limit value is exceeded in a section 13, 20, a traffic jam status of the section is set to "traffic jam". In contrast, if the limit value is not exceeded, a traffic jam status is set to "no traffic jam". The traffic jam status can then be made available to the mobile device as additional information.

In at least one disclosed embodiment, available parking spaces in sections 13, 20 of the digital map 60 are also detected. An item of additional information for a section 13, 20 can then be noted in the digital map 60, for example, as an item of parking space information, for example, "parking garage 1, level 3, parking space 17 ", and can then be provided. An available parking space can then be reserved by the motorized transportation vehicle 40 via a suitable communication platform, for example, via the Internet. This method is carried out, for example, via the map creation device 3 or the server which communicates with a corresponding communication interface of the parking garage. If the reservation is confirmed by the driver of the motorized transportation vehicle 50, the parking space is marked as "occupied" in the digital map 60 by the map creation device 3 or by the server without it being necessary to again capture the section in which the parking space is situated by a camera 4. The reserved parking space is then no longer identifiable as "available" for other road users, but rather remains blocked.

The map creation device 3 is able to transmit the compiled image of the environment 12 as a digital map 60 to the mobile devices 2, in particular, to the motorized transportation vehicle 50, again. If a mobile device 2 receives this information by a receiving device 33, the received section of the environment 12 is compared in the evaluation unit 5 with the section 13 which has just been recorded, and the exact position of the mobile device 2 or of the motorized transportation vehicle 50 is determined by evaluating the difference. If the position has been determined, the mobile device 2 or the motorized transportation vehicle 50 is provided with further information by the map creation device 3 or the server, for example, the traffic jam status and/or conditions of the roadway surfaces. This information is not global, but rather is configured in a lane-accurate manner for the corresponding lane 22 of the motorized transportation vehicle 50 or for the corresponding section 13, 20. The described method therefore makes it possible to show the driver on a multilane road 18 the lane 22 in which the snow on the roadway surface has already been removed by a winter service and the lane 22 in which snow is still lying. Furthermore, it is possible to display, for instance, how great the traffic density is, the lane 22 in which there is a traffic jam and the lane 22 in which the traffic is flowing. In parking garages or underground parking garages, the available parking spaces on the corresponding level can also be displayed.

Furthermore, provision may also be made for the map creation device 3 or the server to be able to roughly determine the viewpoint of the road user by an additionally available item of GPS information and to provide the road user with the image of the environment 12 only on the basis of the GPS information as the digital map 60.

A mobile device 2 may also be, for example, a smartphone, a laptop or a notebook. These may likewise capture, transmit and receive information relating to the environment by the described method, with the result that the receiver is provided with a precise image of its environment. This is beneficial for hikers, cyclists and the like if they have a corresponding mobile device 2 with a camera 4 and require information relating to the environment 12.

In one development, it is also possible for a person to use a mobile device 2 having a camera 4, a transmitting device 6, a receiving device 33 and a suitable method to likewise determine sections 13, 20 and object information, object positions and additional information, with the result that the latter can be used to improve the digital map 60. Therefore, the described method is not only limited to lanes 22 for motorized transportation vehicles 50, but rather can be expanded to all regions which can be captured by a mobile device 2 in an environment 12. In addition to a traffic density for motorized transportation vehicles 50 on roads 18, it is therefore also possible to determine, store and retrieve a traffic density of persons.

Parts of the mobile device 2, of the map creation device 3 and also of the system 1 may be, individually or in combination, as a combination of hardware and software, for example, as program code which is executed on a microcontroller or microprocessor.

LIST OF REFERENCE SYMBOLS

1 System
2 Mobile device
3 Map creation device
4 Camera
5 Evaluation unit
6 Transmitting device
7 Receiving device
8 Joining device
9 Merging device
10 Memory
11 Direction of travel
12 Environment
13 Section
14 Front boundary
15 Rear boundary
16 Right-hand boundary
17 Left-hand boundary
18 Road
19 Surrounding area
20 Further section
21 Rear boundary of the further section
22 Lane
23 Right-hand roadway boundary
24 Left-hand lane boundary
25 Center line
26 Landmark
27 Landmark
28 Object
30 Height sensor
31 Traffic sign
32 Communication connection
33 Receiving device
34 Transmitting device
50 Motorized transportation vehicle
60 Digital map

The invention claimed is:

1. A method for creating a lane-accurate occupancy grid map for lanes, the method comprising in at least one mobile device:
capturing an image sequence of an environment of the at least one mobile device by at least one camera positioned in a direction of travel of a vehicle and with a view of a traffic lane including the vehicle,
identifying and classifying objects in the captured image sequence by an evaluation unit,
determining object positions of the objects relative to the at least one mobile device by the evaluation unit,
defining a section in the environment, the section having a predetermined size and predetermined boundaries,
assigning the identified and classified objects to the determined object positions in the defined section,
determining a lane present in the section by the evaluation unit,
transmitting object information and the object positions of the identified and classified objects, section information relating to the defined section, lane information and an item of time information to a map creation device by a transmitting device,
repeating the preceding operations to define further sections of the environment, wherein in the map creation device:
receiving the object information and the object positions, the section information, the lane information and the time information for each of the sections from the at least one mobile device,
comparing the individual sections with one another based on the object information and object positions, the section information, the lane information and the time information,
joining the sections of the at least one mobile device at their respectively adjacent boundaries,
merging the joined sections of the at least one mobile device to form a digital map, and
determining a current lane occupancy for lanes in sections of the digital map by assigning the at least one mobile device to the determined lane in the corresponding section based on the object information and object positions, section information, the lane information and the time information received from the at least one mobile device.

2. The method as claimed in claim 1, wherein the current lane occupancy is converted into a traffic density by the map creation device and is assigned to an associated section in the digital map as additional information.

3. The method of claim 2, wherein the calculated traffic density is compared with a limit value by the map creation device, a traffic condition "traffic jam" being allocated to the section as additional information if the limit value is exceeded, and a traffic condition "no traffic jam" being allocated to the section as additional information if the limit value is not exceeded.

4. The method of claim 2, wherein the traffic density for a lane in a section is alternatively or additionally determined by the map creation device based on further parameters.

5. The method of claim 1, wherein the lane determined by the evaluation unit in a section is described by a corridor comprising a left-hand lane boundary and a right-hand lane boundary, the left-hand lane boundary and the right-hand lane boundary each being described as lane functions.

6. The method of claim 5, wherein the lane functions are three-dimensional polynomial functions.

7. The method of claim 1, wherein a parking space occupancy is determined by the map creation device for at least one section based on the received object information and object positions, section information, lane information and the time information and this parking space occupancy is assigned, as parking space occupancy information, to the corresponding section in the digital map as additional information.

8. A system for creating a lane-accurate occupancy grid map for lanes, the system comprising:
at least one mobile device comprising:
at least one camera for capturing an image sequence of an environment of the at least one mobile device, the camera being positioned in a direction of travel of a vehicle and with a view of a traffic lane including the vehicle,
an evaluation unit, and
a transmitting device for communicating with a map creation device,
the evaluation unit identifies and classifies objects in the captured image sequence, determines object positions of the objects relative to the at least one mobile device, defines a section in the environment, the section having a predetermined size and predetermined boundaries, assigns identified and classified objects to the determined object positions in the defined section, determines a lane present in a section, transmits object information and the object positions of the identified and classified objects, section information relating to the defined section, lane information and an item of time information to the map creation device by the transmitting device, and repeats the preceding operations to define further sections of the environment; and the map creation device which:

receives the object information and the object positions, the section information, the lane information and the time information for each of the sections from the at least one mobile device, compares the individual sections with one another based on the object information and object positions, the section information, the lane information and the time information, joins the sections of the at least one mobile device at their respectively adjacent boundaries, and merges the joined sections of the at least one mobile device to form a digital map, wherein the map creation device also determines a current lane occupancy for lanes in sections of the digital map by assigning the at least one mobile device to the determined lane based on the object information and object positions, section information, the lane information and the time information received from the at least one mobile device.

9. The system of claim 8, wherein the map creation device converts the current lane occupancy into a traffic density and assigns the traffic density to an associated section in the digital map as additional information.

10. The system of claim 9, wherein the map creation device compares the traffic density calculated for a section with a limit value, allocates a traffic condition "traffic jam" to the section as additional information in response to the limit value being exceeded, and allocates a traffic condition "no traffic jam" to the section as additional information in response to the limit value not being exceeded.

* * * * *